(12) United States Patent
Diaz

(10) Patent No.: US 11,125,500 B2
(45) Date of Patent: Sep. 21, 2021

(54) METHOD FOR EFFICIENT AND EFFECTIVE DRYING

(71) Applicant: Jorge Alonso Diaz, Chambly (CA)

(72) Inventor: Jorge Alonso Diaz, Chambly (CA)

( * ) Notice: Subject to any disclaimer, the term of this patent is extended or adjusted under 35 U.S.C. 154(b) by 148 days.

(21) Appl. No.: 16/626,578

(22) PCT Filed: Jun. 12, 2018

(86) PCT No.: PCT/CA2018/050701
§ 371 (c)(1),
(2) Date: Dec. 28, 2019

(87) PCT Pub. No.: WO2019/014750
PCT Pub. Date: Jan. 24, 2019

(65) Prior Publication Data
US 2020/0132372 A1    Apr. 30, 2020

(30) Foreign Application Priority Data
Jul. 18, 2017  (CA) ................................ CA 2973708

(51) Int. Cl.
*F26B 19/00*  (2006.01)
*F26B 11/04*  (2006.01)
*F26B 9/06*   (2006.01)
*F26B 21/10*  (2006.01)
*F26B 23/00*  (2006.01)

(52) U.S. Cl.
CPC .............. *F26B 11/049* (2013.01); *F26B 9/06* (2013.01); *F26B 21/10* (2013.01); *F26B 23/004* (2013.01)

(58) Field of Classification Search
CPC .......... F26B 11/049; F26B 9/06; F26B 21/10; F26B 21/12; F26B 23/004; F26B 2200/06; F26B 3/06; Y02P 70/10; Y02B 30/52
USPC .................. 34/551, 514, 513, 73, 84, 76–78
See application file for complete search history.

(56) References Cited

U.S. PATENT DOCUMENTS

| | | | | |
|---|---|---|---|---|
| 3,953,927 A | * | 5/1976 | Hoffert | ...................... F26B 3/00 34/349 |
| 4,644,664 A | * | 2/1987 | Bradshaw | ............... F26B 3/084 34/361 |
| 2005/0066538 A1 | * | 3/2005 | Goldberg | ................ D06F 34/26 34/218 |
| 2012/0117816 A1 | * | 5/2012 | Yokohama | ................ F23K 1/04 34/360 |
| 2013/0125412 A1 | * | 5/2013 | Haarlemmer | ........... F26B 3/205 34/477 |

(Continued)

*Primary Examiner* — John P McCormack

(57) ABSTRACT

Hot air drying is an intensive energy consuming process, 5000-8000 kJ per kg of water. More efficient processes produce low drying rates or cannot totally dry the product because they do not integrate the four drying phases, warm up, constant drying, falling drying and aeration and do not handle dripping. To reduce the energy consumption, the exhausted mix of air and vapor is used as working fluid to drive each phase, and the dripping is collected before it goes back to the product. This fluid is compressed inside of a heat-exchanger to heat the product; however, the mix proportion, vapor and air, changes on each phase. For warm up phase, the working fluid is either hot air or condensed water; in constant phase, it is mostly vapor; in falling phase, it changes from vapor to air; and for aeration, it is air. Inlet and outlet valves control these proportions.

13 Claims, 11 Drawing Sheets

(56) References Cited

U.S. PATENT DOCUMENTS

2014/0310979 A1* 10/2014 Bergset ................ C01F 11/185
   34/487
2016/0348023 A1* 12/2016 Edel ...................... F26B 23/005
2017/0145624 A1*  5/2017 Dulberg ................ D06F 58/20

* cited by examiner

[Fig. 1]
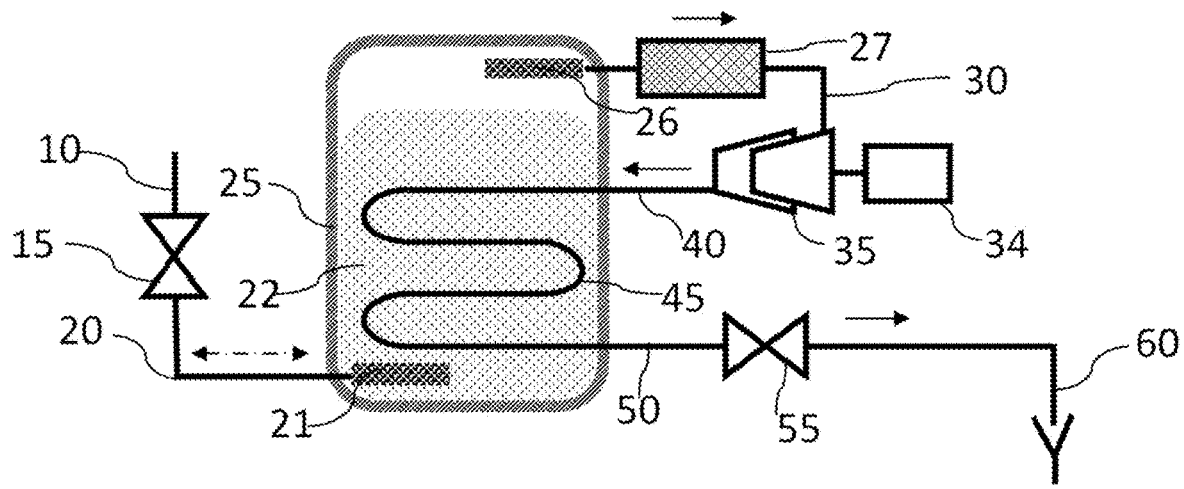
[Fig. 2]
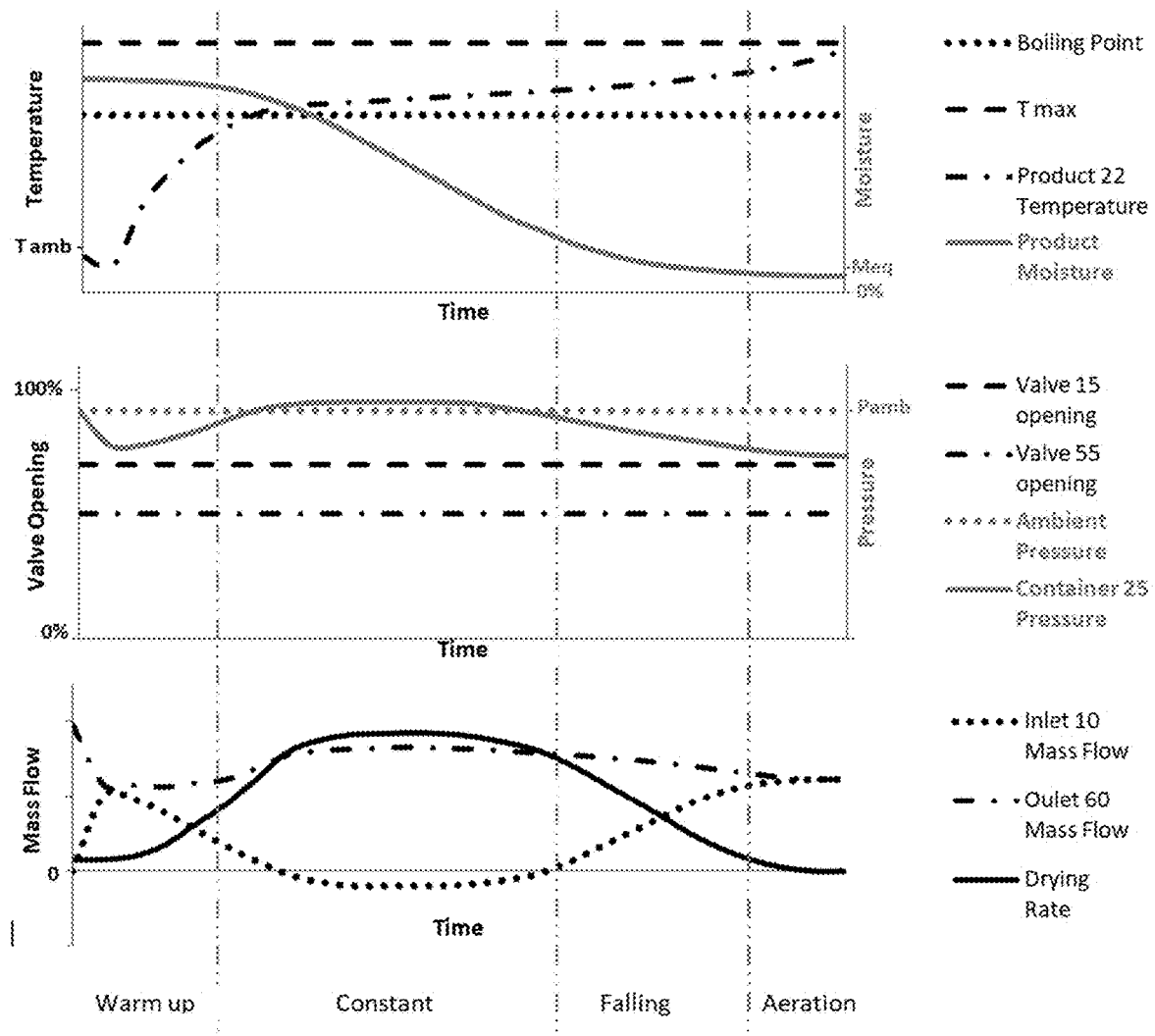

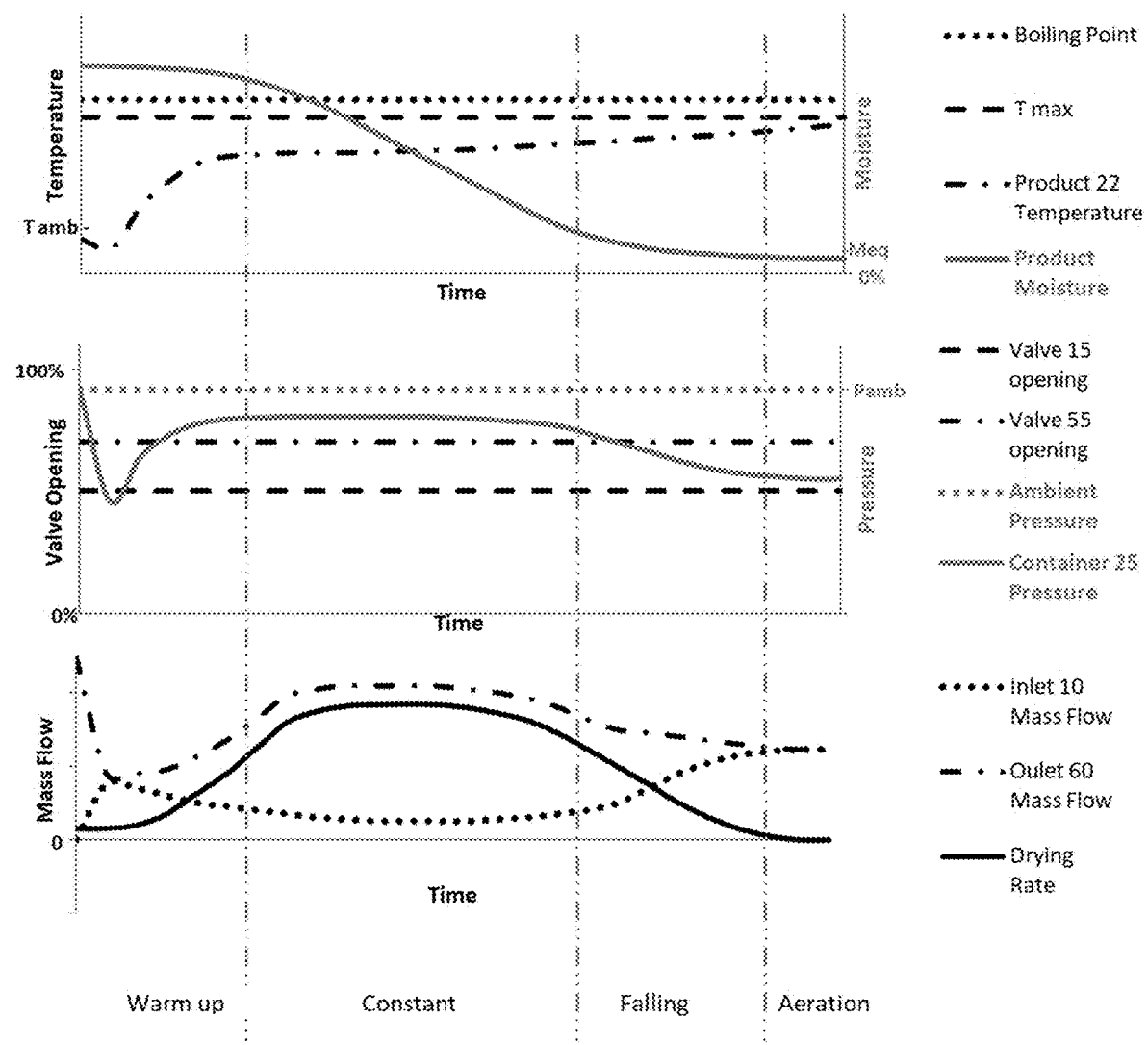
[Fig. 3]

[Fig. 4]
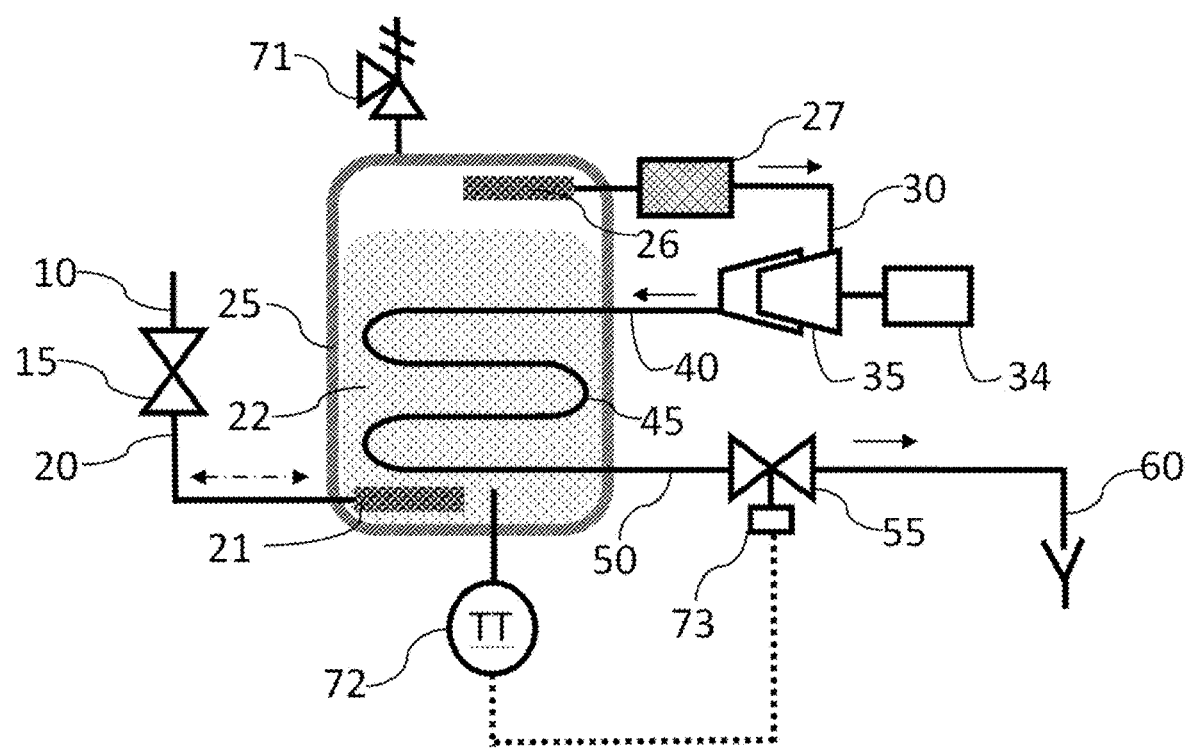

[Fig. 5]
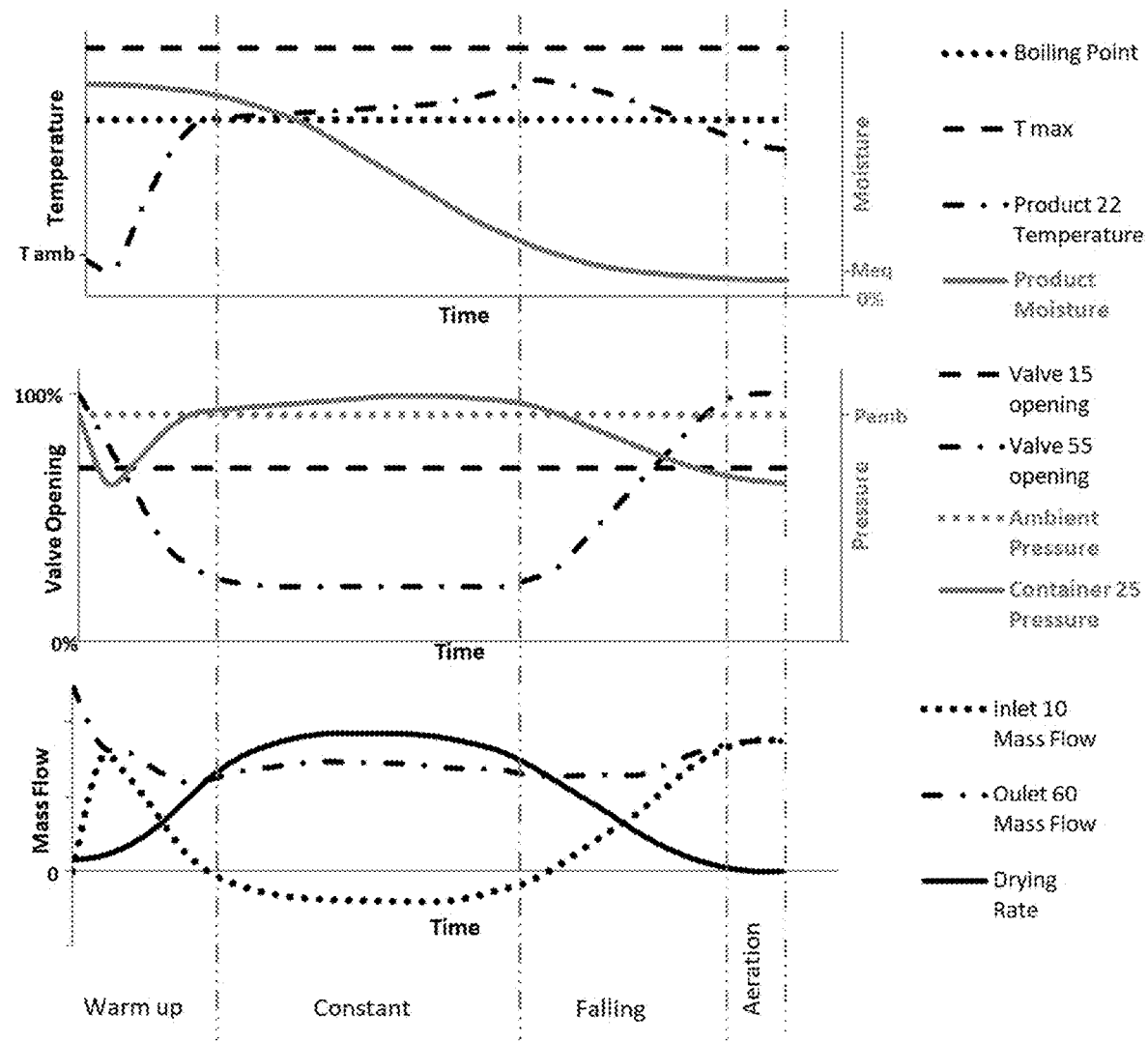

[Fig. 6]
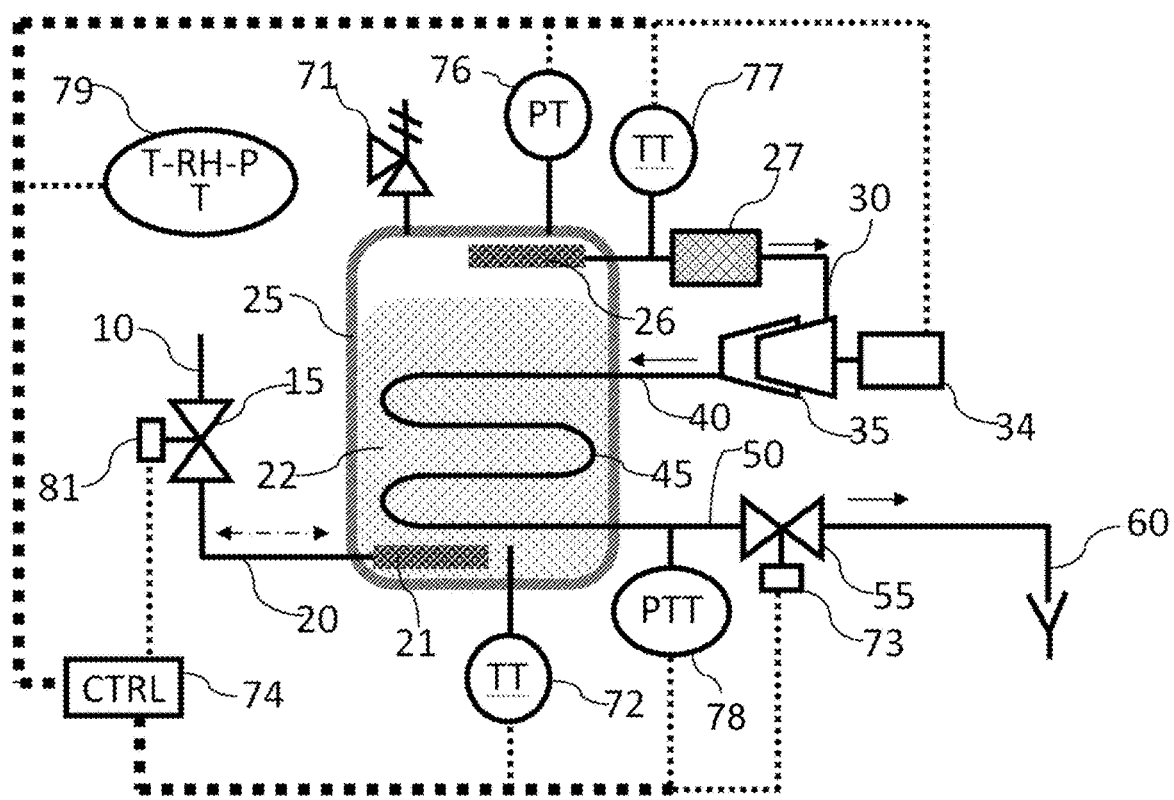

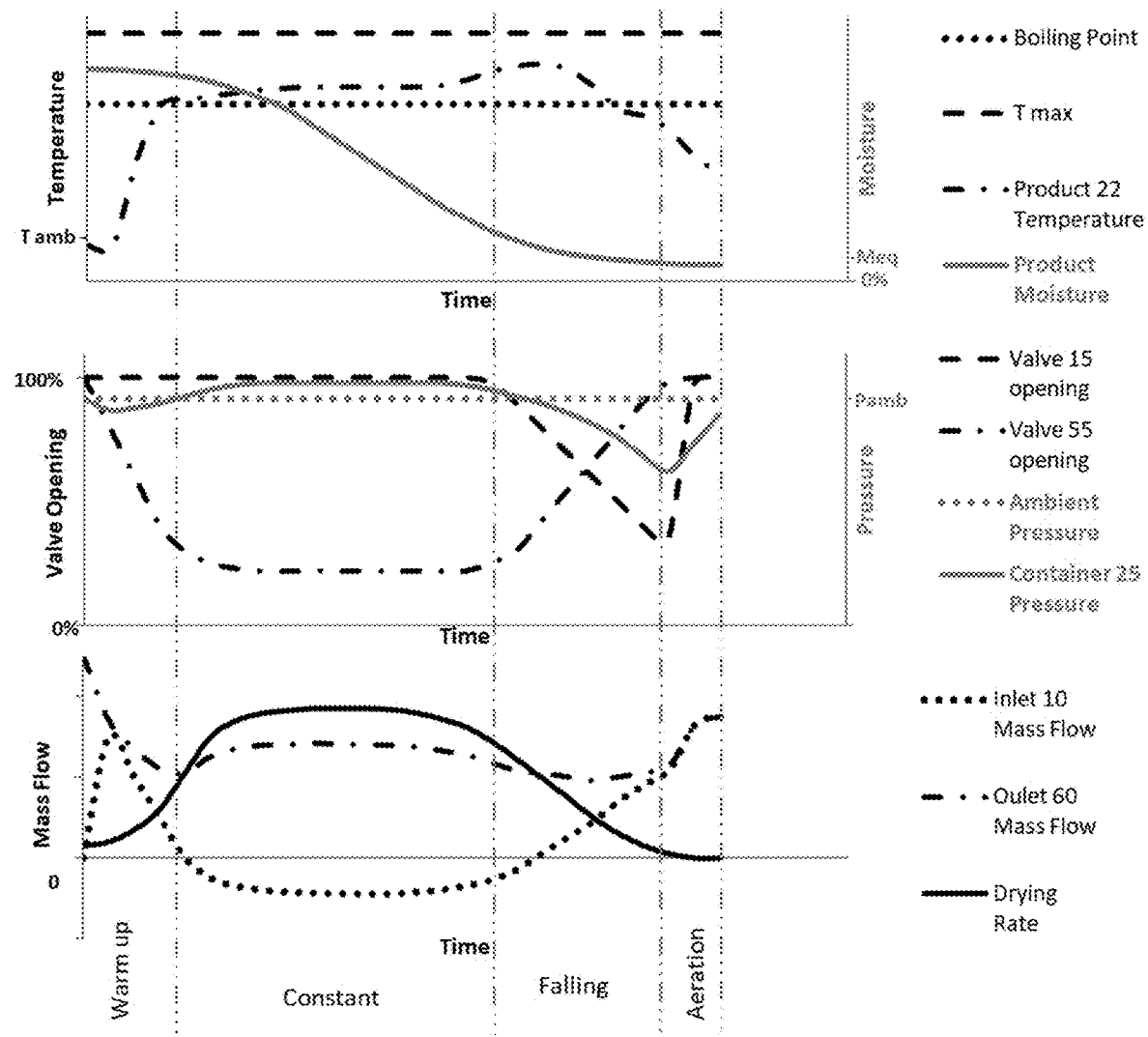
[Fig. 7]

[Fig. 8]
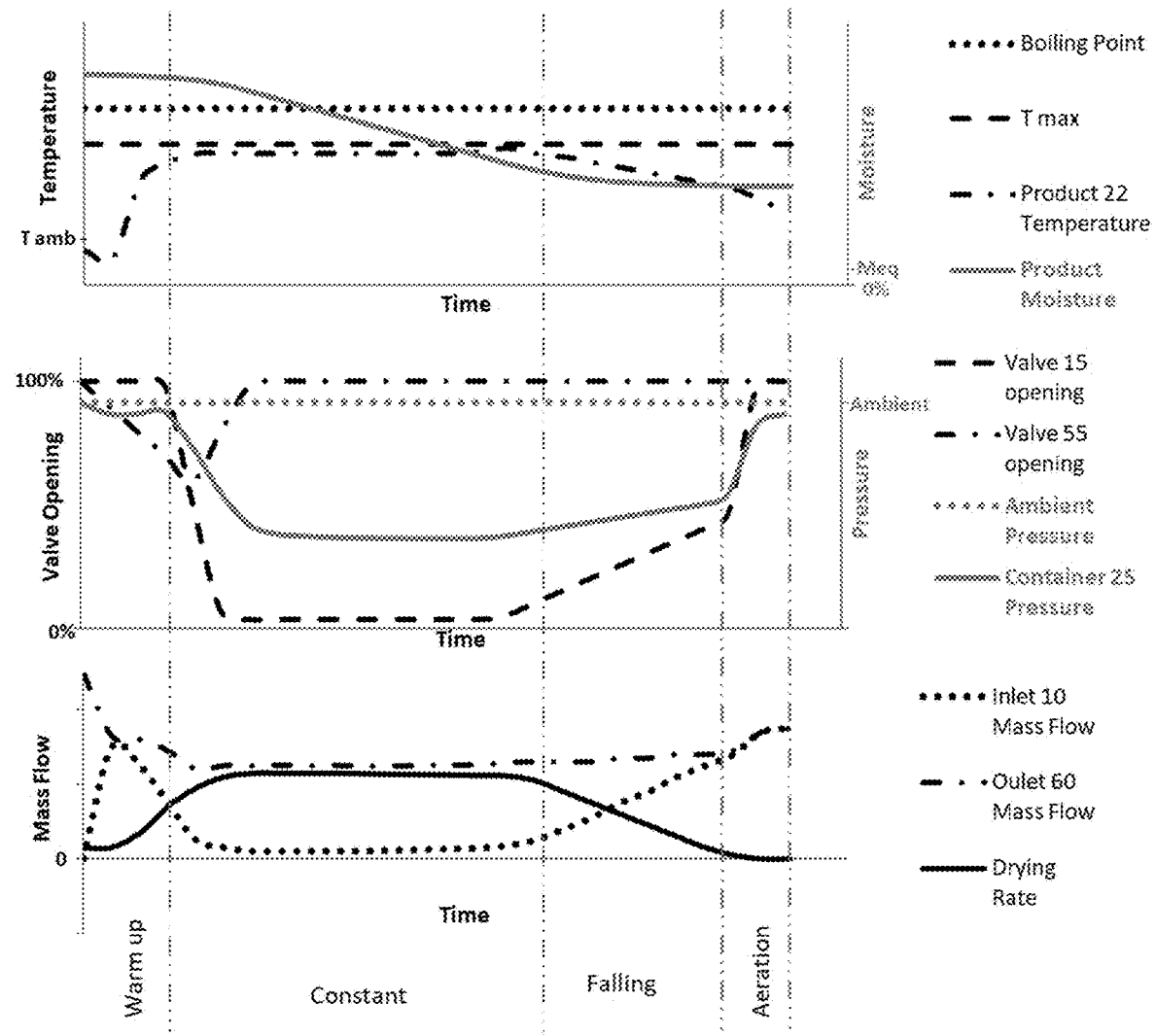

[Fig. 9]
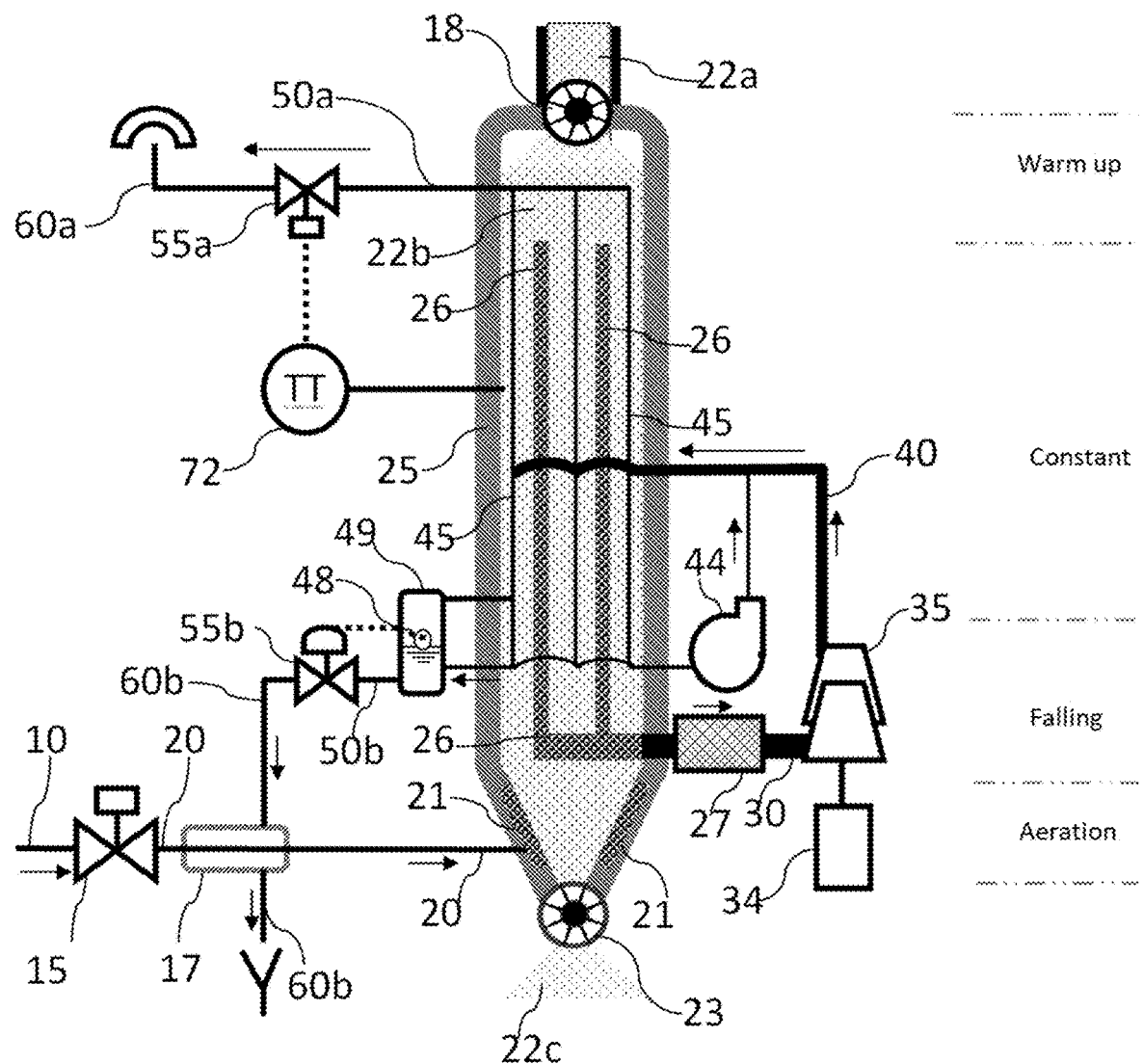

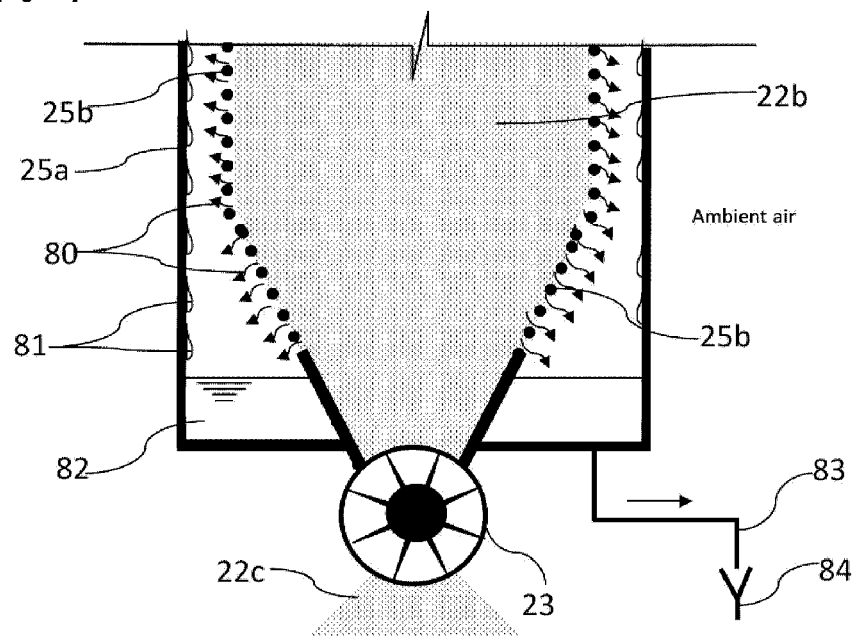
[Fig. 10]

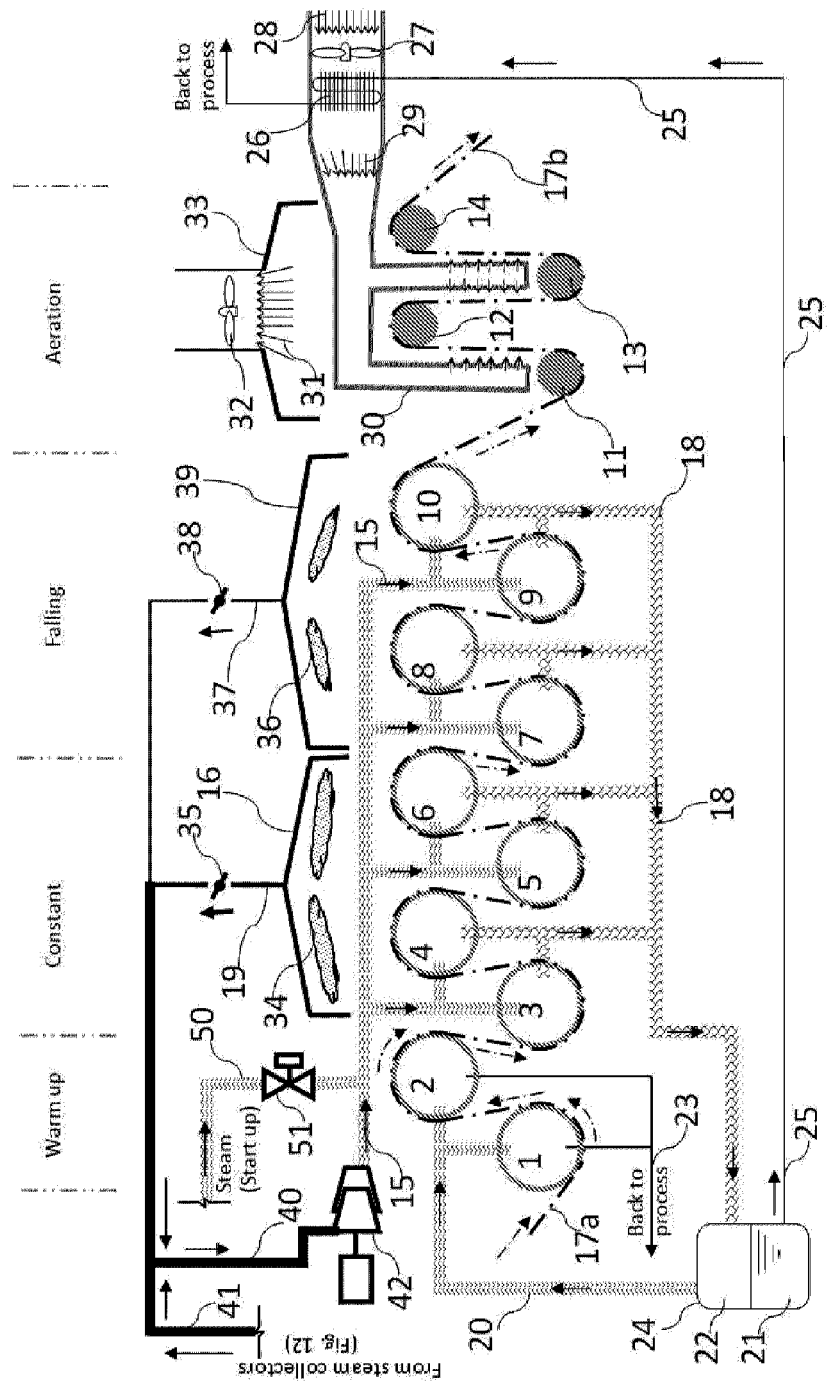
[Fig. 11]

[Fig. 12]
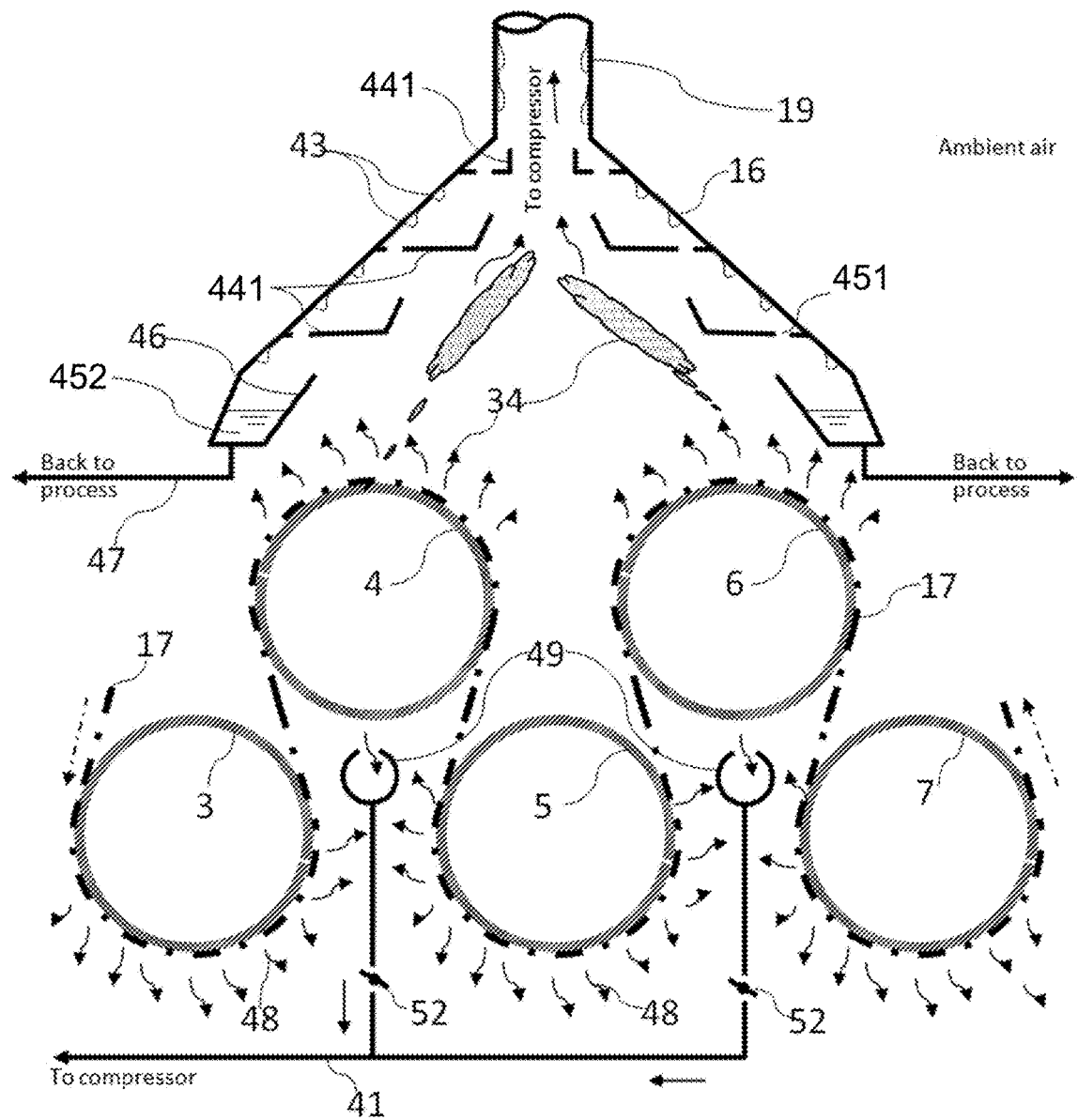

METHOD FOR EFFICIENT AND EFFECTIVE DRYING

TECHNICAL FIELD

The present invention relates to a method to totally or partially dry a product, with low energy consumption and high drying rates. In this document, totally dry means to reduce product moisture to its equilibrium moisture (Meq) or lower; understanding for equilibrium moisture the level of moisture at which there are no water transfer between the product and its surrounding environment when they are at the same temperature and pressure.

BACKGROUND ART

Drying is a slow and/or inefficient process. In most of the drying processes, all the energy invested is released to the ambient, making it an intensive energy consuming process. There are a few dryer designs which reuse the energy but dry at slow rate or cannot totally dry the product; in other words, the final product moisture is higher than the equilibrium one (Meq).

Drying has four phases and one drawback; warming up phase, constant drying phase, falling phase and aeration phase; and the underestimated dripping. Dryers which use heated ambient air do the four phases by default; when a more efficient dryer is design, however, one or two phases are missed, and dripping is not controlled. This leads to an ineffective process, either long retention time or final product not totally dried.

Warming up phase: While the product is cold, practically all the energy invested in the process is used to warm it up and the drying rate is low; the leaving air is cold and cannot carry too much moisture. Usually, there is moisture migration from product already heated to zones with product still cold; hence, increasing its moisture which is not desirable.

Constant phase: Once the product is warm, the leaving air is warm too; hence it can carry more moisture per kg or dry air; the surface product moisture evaporates easily and the air gets almost totally saturated. Water vapor does not require air to transport itself when the temperature is equal or higher than the boiling point; some drying processes, however, still blow hot air to prevent dripping condensation on equipment cold surfaces.

Falling phase: Once the product surface moisture is removed, the water migration from inside the product limits the evaporation rate; the air is not longer saturated and the product temperature increases due to the lower evaporation rate.

Aeration: At the end of the drying process, it is necessary to blow warm air to displace the vapor around the product to prevent condensation on product surface. Replacing vapor by air occurs by default while drying with ambient air. However, in some dryers, the drying air is reused directly into the product and its high humidity remains around the product at the end. Once the product is back to the ambient conditions, temperature and pressure, part of the air humidity condenses again on the product surface.

Dripping is formed when warm vapor inside the drying equipment touches a cold surface, generally a wall which other surface is at ambient conditions, the colder the weather, the higher the dripping rate. Once these drops go back to the product, they have to be evaporated again; it is like paying twice the same bill. As mentioned in the constant phase paragraph, some processes blow additional hot air to prevent dripping, but this implies to expend more energy.

Technical Problem

The most common process for drying is blowing hot air through the product. Ambient air is heated using electricity, burning fuels or using solar energy; then it passes through the product; finally, the moist and humid air goes to the ambient. All the energy is gone in form of vapor and warm air.

Heat pumps used for drying employ a refrigerant as working fluid and reuse the energy by cooling the leaving air; this recovered heat warms up the incoming air. The heat pump evaporator is installed immediately after the air leaves the product; this produces water condensation which is pumped out the system. The heat pump condenser is installed in the incoming air path to warm it up. There are two types of heat pump dryers depending of the use for the leaving air; one reuses the cooled air and reheats it, the other gets newly fresh air and warms it up.

The heat pump dryers which reuse the leaving air are limited by the moisture left in the air after the evaporator. When the condensation is produced, air relative humidity (RH) is 100%; the air is saturated of moisture and is not able to carry more. Once air is warmed up again, its RH is lower but not enough to dry fast; this increases the retention time of the product. At the end of the process, the final product moisture is higher than the equilibrium moisture (Meq) because the drying air is humid, and the remaining vapor is not replaced by ambient air.

For the heat pump dryers that take fresh air, the energy efficiency is sacrificed. The ambient air is generally cold; the energy recovered, therefore, is not enough to warm up the air to the desire temperature. The partially warmed up air has to be heated by an additional heat source. Once these two energy sources, the one to power the heat pump compressor and the one used by the heater, are taken into account, the efficiency is low, or said in other words, the energy consumption is high.

Compressing exhausted air/vapor recovers most of its thermal energy. However, systems that actually use this process do not integrate effectively the drying cycle; hence these systems end up with an extra heater or cannot totally dry the product. In some cases, the aeration phase is done after the product leaves the dryer and requires additional energy. U.S. Pat. No. 2,477,044-1946 discloses the basic principle of compressing the leaving vapor to recover its energy; however, it does not take in to account two phases of the drying process, the energy required to warming up the product at the beginning of the process and the aeration at the end of it.

For instance, U.S. Pat. No. 5,806,204-1998 discloses a clothes dryer which compresses the vapor to recover its energy by condensation. At the beginning of the process, once the compressor starts, clothes are at ambient temperature which limits the rate of evaporation; since there is not incoming air, the vapor and energy flows are low. The warming up phase takes too long or may never happen, and the drying process occurs at low temperature, which means a low drying rate and a long retention time. At the end of the process, most of the air inside the dryer has been replaced by vapor. Once the pressure is restored to the ambient one, most of this vapor condenses again on clothes' surfaces.

SUMMARY OF INVENTION

The present invention provides for efficient and effective product/material drying method. In the present invention, a wet product comes to the equipment where it is heated to evaporate its moisture which is used as working fluid. A compressor takes this working fluid and pressurizes it into a heat exchanger; this increases the fluid temperature. The heat exchanger transfers the thermal energy in the working fluid back to the product; this reduces the fluid temperature generating condensation. Finally, the working fluid leaves the equipment through one or several valves. The drying method disclosed in this document can be applied for batch or continuous drying, and depending on the drying stage and temperature, the working fluid can be air, vapor, its condensate or a mix of these.

For BATCH DRYING, the equipment and material to be dried are cold at the beginning; the working fluid is only air for warming up the product. As the temperature rises, so does the amount of vapor in the working fluid. In the constant phase, the working fluid is mostly vapor. During falling phase, the amount of vapor is reduced until it is only air again in the aeration phase. The amount of incoming air is controlled either by the compressor speed or by valves in the working fluid inlet and outlet.

During warm up phase, when the product is cold and air is the working fluid, its compression heats up the heat exchanger; hence, the product is rapidly heated due to the large flow allowed by the inlet valve. Once the product is warm, during the constant drying phase, the water evaporation from the product increases the vapor content of the working fluid and the amount of incoming ambient air is reduced. Its compression still heats the process; however, most of the energy is recovered by vapor condensation in the heat exchanger. The temperature and pressure of condensation is controlled by the valve installed in the outlet.

In the falling phase, the evaporation rate reduces gradually; therefore, the amount of incoming air increases progressively keeping the mass and energy flows as high as possible. The working fluid gets rich in air again. This extra air, heated by the heat exchanger, moves in middle of the product transporting heat and removing the remaining moisture inside of it. If the desire product moisture is higher than the equilibrium moisture (Meq), the process can be stopped in middle of the falling phase.

If the product must be totally dry, the aeration phase replaces most of the vapor inside and around the product; vapor cannot be null since the ambient air has moisture. Even though the ambient air has humidity, the final product moisture is lower than its equilibrium moisture (Meq) due to its higher temperature.

In a non automatic process, both valves, inlet and outlet, are adjusted to a fix position which should assure that temperature and pressure are in the allowable ranges for the equipment and the product on every stage.

For an even more efficient and effective process, an automatic control can be installed. It adjusts the valves' openings and/or compressor speed. Temperature and pressure sensors are installed; depending on their measurements and drying phase the control unit adjusts valves' positions. The compressor speed can be adjusted to avoid dropping the pressure below the one supported by the equipment or to control the drying temperature to avoid overheating the product.

CONTINUES DRYING is used for high drying rates; each drying phase occurs in a different equipment section, like grain drying. In some cases, like paper drying, each drying phase is performed by different equipment in the same facility. At start up, the working fluid for heating up both equipment and material is only air; as the temperature increases, so does the amount of vapor in the working fluid. The stable running condition starts once the temperature reaches the set point. The moisture evaporated in constant and falling sections, which may contain a small fraction of air, becomes the working fluid.

The working fluid is compressed and becomes superheated steam. In constant and falling sections, heat exchangers transfer the thermal energy from the steam back to the material for evaporating its moisture; this condensates most of the steam in the working fluid. The difference between the two sections is the amount of energy transferred on each one; constant section absorbs more heat from the compressed working fluid since the evaporation rate is higher than in falling section.

When the working fluid leaves the constant and falling sections, it is a low quality saturated steam but is still pressurized. It is used in the heat exchangers in the warming up and aeration sections.

The heat exchangers, either for batch or continues drying, can be of many types depending on the product to be dried: a pipe exchanger would be enough for bulk materials; a jacket around the container would be better for laundry and fabrics, and furthermore a rotating jacked drum as container; rotating heated cylinders are already in use for laminar materials like paper. A fan can be installed to enhance the heat transfer inside the equipment. A flexible container is another option to increase the heat transfer to the product.

The method disclosed in this document also introduces the concept of "dripping control" in drying processes to prevent the condensation to go back to the product. One option is to insulate the equipment to limit the heat transfer through its walls; hence, reducing the dripping rate. The other option, if the heat losses are not an issue, is to use condensation on equipment walls to remove moisture; however, one has to catch the drops before they it go back to the product. Depending on equipment geometry, the drops can be collected on trays or using a doubled wall. When the wall is inclined over the product, it forms a hood; the drops will tend to fall on the product. Several trays are installed below the hood to collect these drops and transport them outside the equipment. When the product is in contact with the equipment walls, the solution is a double wall with a perforated inner barrier which allows the vapor to pass but the product; the vapor reaches the outer wall where it condensates and falls to a pool at the bottom or is collected on trays.

When there is heat surplus, enhancing dripping increases the drying rate; three preferred options can enhance it. The first option is a fan that blows air around the external surface of the double wall to increase the heat transfer; the colder the external wall, the higher the dripping. Other cold fluids can be used as well. The second option for enhancing dripping is an internal double walled pipe; in this case, the external pipe is the one perforated and condensation occurs in the external surface of the inner pipe. The cold fluid flows inside the internal pipe. When the double walled pipe is vertical, drops are collected at bottom. When this pipe is horizontal or inclined, the external pipe is only perforated on its crown while the external pipe invert collects the drops.

The third option can be implemented when the cooling fluid is water, and dripping happens directly on it; the warm vapor condensates directly on cold water surface. However, one has to ensure that the cooling water never touches the product. One case is a hood with drip trays; the cooling water is pumped at one tray end. At the other end, the cooling water plus the condensed vapor are collected; this exhausted water is warmer. Other case is the equipment with a double wall mentioned above; product is still contained inside the interior perforated wall, but the cooling water is thrown over the internal surface of the external wall. An additional case is a perforated vertical duct surrounded by the warm product; the cooling water flows from top to bottom without touching the duct walls. For preventing this contact, a chain, rope or rod can be installed in middle of the perforated duct. The cooling water and the condensed steam are collected at bottom.

The compressor can be driven by different types of motors such as an engine, an electrical motor or a turbine. The wasted heat from the motor can be used to heat up the product and/or the working fluid in any of the drying phases, warm up, constant, falling and/or aeration. The compressor can be of any kind such as reciprocating, scroll, screw, rotary, centrifugal or thermocompressor.

The specific design would depend on technical-economical analysis regarding product characteristics, energy source availability and production costs. For instance, during the constant phase, the dryer works pressurized when the drying temperature is higher than the boiling point (temperature at which the vapor pressure is equal to the atmospheric pressure Tsa). Some products may get damaged at these high temperatures, like seeds or grains; hence, the temperature has to be kept below the boiling point.

For reducing the drying temperature, there are two options, working below atmospheric pressure or let additional air to come into the dryer. The first option requires that the pressure inside the dryer goes down to the pressure of saturation at the drying temperature; this partial vacuum requires a more robust and expensive equipment. The second option is to allow ambient air, in addition to the one required for the warming up and aeration phases, to come inside the container; this makes the dryer to work close to the ambient pressure, but the compressor has to move an extra amount of air which leads to an additional energy consumption. The equipment is cheaper than in the first option, but its efficiency is lower.

BRIEF DESCRIPTION OF DRAWINGS

FIG. 1 is a schematic drawing of a preferred embodiment of the invention for batch drying.

FIG. 2 is a plot of the operational curves of dryer shown in FIG. 1 when the drying temperature is above the boiling point.

FIG. 3 is a plot of the operational curves of dryer shown in FIG. 1 when the drying temperature is below the boiling point.

FIG. 4 is a schematic drawing of a preferred embodiment of the invention for batch drying with a temperature control.

FIG. 5 is a plot of the operational curves of dryer shown in FIG. 4 when the drying temperature is above the boiling point.

FIG. 6 is a schematic drawing of a preferred embodiment of the invention for batch drying with an automatic control.

FIG. 7 is a plot of the operational curves of dryer shown in FIG. 6 when the drying temperature is above the boiling point.

FIG. 8 is a plot of the operational curves of dryer shown in FIG. 6 when the drying temperature is below the boiling point.

FIG. 9 is a schematic drawing of a preferred embodiment of the invention for continuous drying of bulk materials.

FIG. 10 is a schematic drawing of a preferred embodiment of the invention for the dripping control double walled device in a drying process.

FIG. 11 is a schematic drawing of a preferred embodiment of the invention for continuous drying of laminar materials FIG. 12 is a schematic drawing of a preferred embodiment of the invention for the dripping control with trays in a drying process.

DESCRIPTION OF EMBODIMENTS

FIG. 1 shows a preferred embodiment for performing the disclosed method in a batch dryer. The device includes a container 25 where the product to be dried 22 is placed inside. Inlet 10 allows the ambient air to enter, through valve 15 and conduit 20, inside the container 25; valve 15 restricts the amount of air flowing depending on its percentage of opening. The incoming air and product 22 are heated by heat exchanger 45 which causes evaporation from product moisture. The working fluid, air/vapor mix, is sucked up from container 25 through conduit 30 by compressor 35 which pressurizes the working fluid to be delivery to heat exchanger 45 through conduit 40; this pressurization raises the fluid temperature. Inside the heat exchanger 45, the pressurized and hot fluid transfers back its thermal energy to the product 22; this cools down the working fluid and generates water condensation. The working fluid leaves the heat exchanger 45 through conduit 50 to find the valve 55 where the pressure drops to equal the ambient one; finally, it goes out through outlet 60.

The container 25 can be double walled for dripping control; an example of such configuration can be seen in FIG. 10. Meshes 21 and 26 prevent the product to enter into conduits 20 and 30, respectively. Filter 27 is installed on conduit 30 to protect compressor 35 from solid particles; the compressor is driven by an engine or a motor 34 which wasted heat can be used into the process to make it even more efficient.

Under certain circumstances, inlet 10 may work as an outlet. If the product temperature is higher than the boiling point, the product moisture boils during the constant drying phase, and the evaporation rate may be higher than the flow pumped up by compressor 35. Hence, pressure inside container 25 increases over the ambient one, which pushes the exceeding vapor through inlet 10. The closer the valve 15 is, the higher the pressure inside container 25, and more vapor leaves trough the compressor 35 rather than counter-flowing through inlet 10. Also, the compressor efficiency affects the proportion of vapor which leaves the container through inlet 10 during this particular circumstance; the more efficient the compressor is, the fewer the vapor counter flows through inlet 10.

Valves 15 and 55 can be adjusted depending on product characteristics and drying conditions. For instance, a full open valve 55 will make the compressor 35 to deliver the working fluid slightly over the ambient pressure just to compensate the pressure loses inside the heat exchanger 45. For fix equipment, these valves can be small pipes or throttles. For adjustable equipment, these valves have variable opening and can be of any type such as gate, ball, butterfly, choke, diaphragm, needle and globe among others.

FIG. 2 shows the typical operation curves for the batch dryer described on FIG. 1 when the maximum drying temperature is above the boiling point. Valve 15 is highly open to keep the pressure inside the container 25 near to the ambient one, and valve 55 is mostly closed to keep the temperature inside the heat exchanger 45 about 20 to 50° C. over the boiling point.

FIG. 3 shows the typical operation curves for the batch dryer described on FIG. 1 when the maximum drying temperature is below to the boiling point. Valve 15 is mostly closed to generate a partial vacuum inside the container 25. Valve 55 is highly open because the pressure ratio of compressor 35, due to the partial vacuum, is enough to raise the temperature inside the heat exchanger 45 about 20 to 50° C. over the product temperature.

FIG. 4 shows a preferred embodiment for performing the disclosed method in a batch dryer with a basic control and a safety valve in addition to the components described on FIG. 1. This device includes a temperature sensor 72 which controls the actuator 73 of valve 55; this control makes the equipment more efficient because it maximises the mass flow on each phase. First, warming up the product faster; then, to keep its temperature close to the maximum allowable during constant and falling phases; and finally, to cold it down during aeration phase. This control strategy enhances higher drying rates, shorter retention time and lower energy consumption. The safety valve 71 prevents the pressure to drop below the design point for container 25; when the pressure reaches the set point, it opens to let more ambient air to come in.

FIG. 5 shows the typical operation curves for the batch dryer with basic control shown on FIG. 4 when the maximum drying temperature is above the boiling point. For warming up the product, Valve 55 is fully open to allow the maximum flow through the system and is closed gradually as the product temperature increases. Once the temperature reaches the boiling point, the valve is kept in the same opening position during the constant phase. When the temperature increases further, at the beginning of falling phase, valve 55 is opened gradually. Finally, at fully open position again, valve 55 allows the maximum flow to aerate the container 25 rapidly.

FIG. 6 shows a preferred embodiment for performing the disclosed method in a batch dryer with an automatic control. In addition to the components described on FIG. 1, this device includes a control unit 74 which receives the signals from: sensor 72 which measures the temperature of product 22; sensor 76 which measures the pressure inside the container 25; sensor 77 which measures the temperature of the fluid in pipe 30; sensor 78 which measures the pressure and temperature of fluid in pipe 50 and sensor 79 which measures the ambient conditions, pressure (Pamb), temperature (Tamb) and relative humidity (RH).

Based on the signals from sensors, control 74 estimates the drying phase and the operational parameters, pressure and temperature, to increase process performance, either more efficient or faster. Control 74 calculates the product moisture and stops the process once the set point is reached; it also opens valves 15 and 55, and regulates the speed of compressor 35 by sending signals to actuators 81 and 73 and driver 34, respectively.

FIG. 7 shows the typical operation curves for the automatic batch dryer described on FIG. 6 when the maximum drying temperature is above the boiling point. This scenario is typical for laundry drying where maximum temperatures are around 130° C. to 170° C.

Before starting the compressor, the equipment is at ambient temperature and pressure, 1 atm and 22° C. in this example; valves 15 and 55 are fully open; and the laundry temperature is about 1 to 5° C. below ambient temperature due to the natural air drying which saturates the air around the product. Once the compressor 35 is started, it sucks up easily the air already inside the container 25 because there is not delta pressure; this creates a high flow in outlet 60 because valve 55 is fully open; the container pressure is reduced slightly; and the ambient air starts coming in easily through inlet 10 because valve 15 is fully open too.

Control unit 74 starts closing valve 55 progressively to raise the air pressure and temperature inside heat exchanger 45 warming up the laundry; this closing is made progressively to keep the mass and energy flows as high as possible. The temperature difference between sensor 79 and 72 indicates when to close the valve 55 further; this difference is maintained at about 20-50° C. Once the laundry reaches the boiling point, the rapidly evaporation of its free moisture displaces the air inside the container, and the control unit 74 starts the constant phase strategy.

The pressure inside the container is slightly higher than the ambient one, then the inlet 10 works as an outlet, and the vapor which is not taken by compressor 35 flows through it. If the counter flow through inlet 10 is not desired, valve 15 can be fully closed during constant phase which may raise the pressure inside the container 25 further to about 1.010-1.020 atm. Once the free moisture is removed, the lower evaporation rate causes the product temperature to increase; to limit it, the control unit 74 starts the falling phase strategy.

Valve 55 is opened gradually to reduce temperature inside heat exchanger 45, and valve 15 is partially close reducing the pressure inside container 25 to around 0.7-0.9 atm. This pressure drop makes the moisture inside the fabrics to migrate faster to the surface where it is evaporated. Since the pressure in container 25 is lower and there is incoming air through inlet 10, the drying temperature starts to fall gradually; at the end of the falling phase, it is about 60-90° C.

Finally, the saturated air inside the container is flushed by fully opening valve 15; this aerates the system and prevents condensations on clothes. When the laundry temperature reaches around 40 to 60° C., unit 74 turns off the compressor 35.

FIG. 8 shows the typical operation curves for the automatic batch dryer described on FIG. 6 when the maximum drying temperature is below the boiling point. This is the scenario for cereals drying where maximum temperatures are around 40° C. to 80° C. Cereals are partially dry to extend their shelf life, their initial moisture may be about 20-30% wet basis, and it has to be reduced to about 11-15% wet basis.

Before starting the compressor, the equipment is at ambient temperature and pressure, 22° C. and 1 atm respectively in this example; valves 15 and 55 are fully open; and the cereal temperature is about 1-5° C. below the ambient one due to the natural air drying which saturates the air around the product. Once the compressor 35 is started, it sucks up easily the air already inside the container 25 because there is not delta pressure; this creates a high flow in outlet 60 because valve 55 is fully open and reduces slightly the container pressure; hence the ambient air starts coming in easily through inlet 10 because valve 15 is fully open too.

Control unit 74 starts closing valve 55 progressively to raise the air pressure inside heat exchanger 45; this raises its temperature too warming up the cereal. This closing is made progressively to keep the mass and energy flows as high as possible. The temperature difference between sensor 79 and 72 indicates when to close the valve 55 further; this difference is maintained at about 20-50° C. Once the cereal reaches a temperature about 70-75° C., the control unit 74 starts the constant phase strategy.

Valve 55 is fully opened again, and valve 15 is closed progressively until the pressure inside container is about 0.35-0.45 atm. The air coming through valve 15 controls the product temperature, keeping it below 80° C.; another control strategy for no overheating the cereal is to reduce the speed of compressor 35.

Once the free moisture is removed, the lower evaporation rate causes the product temperature to rise further; the control unit 74 starts the falling phase strategy to avoid this rising.

Valve 15 is gradually opened to compensate the lower evaporation rate, keeping the energy and mass flows as high as possible. This reduces the cereal temperature progressively to around 50-65° C. at the end of the falling phase.

Finally, the humid air inside the container is flushed by fully opening valve 15; this aerates the system and prevents future condensations on cereal. When the cereal temperature reaches about 35 to 45° C., unit 74 turns off the compressor 35.

FIG. 9 shows a preferred embodiment for performing the disclosed method in a continuous dryer for bulk materials. The wet product 22a comes inside the container 25 (preferably double walled for dripping control as shown in FIG. 10) through the airlock valve 18; once inside, the product 22b is heated by the external surface of heat exchanger 45 which warms it up and makes the water on product 22b surface to evaporate. Mesh 26 collects the working fluid, air/vapor mix, and delivers it to compressor 35 through pipe 30 which has filter 27. Motor/engine 34 drives compressor 35 to increase the fluid pressure and temperature, also the driver's wasted heat can be used into the drying process to make it even more efficient. Pipe 40 transports the compressed fluid to inside the heat exchanger 45 where vapor condenses transferring its latent heat to product 22b. The air and vapor not condensed go to the top of the heat exchanger 45 and leaves the heat exchanger 45 through pipe 50a. The condensed water inside the heat exchanger 45 falls to the bottom and is collected into tank 49. Level sensor 48 opens valve 55b when tank 49 is full to drain the water through pipes 50b and 60b and closes it once the tank 49 is empty. Dry product 22c is released by airlock valve 23.

Temperature sensor 72 controls product 22b temperature. Valves 55a is partially open to let the air and the non condensed vapor to leave the process through vent 60a; this keeps the pressure inside the heat exchanger higher than the ambient one. When the product temperature reaches the set point, the sensor 72 sends a signal to open valve 55a further.

The working fluid inside pipe 40 is superheated around 150 to 250° C.; to prevent overheating the product 22b, this fluid has to be partially cooled before enter to heat exchanger 45. One option is to install pump 44 which recirculates part of the condensate from heat exchanger 45 and injects it into pipe 40 to reduce the fluid temperature. Other option, not shown, is to make the walls of heat exchanger 45 thicker in the zone near pipe 40 to reduce the heat transfer rate; the working fluid is cooled down in this extra insulated zone without overheating the product. After this zone, the working fluid is colder at around 100 to 140° C., and the walls of heat exchanger 45 are thinner.

Depending on the required temperature for the final product 22c, a heat exchanger 17 may be installed. If the final product is required to be as cold as possible, the incoming air in pipe 20 should not be heated. However, if the final product 22c can be warm, a heat exchanger 17 is installed to recover part of the heat of the condensed water in pipe 60b. This enhances the drying efficiency even further.

Inlet 10 has two different operational conditions, start up and stable running. Before starting the dryer operation by compressor 35, the whole system and product are at ambient conditions, same temperature and pressure. For starting up de dryer, valve 15 is fully open to allow the maximum air income through pipe 20; mesh 21 is installed to prevent product 22b to enter into this pipe. Valve 55a is also fully open to allow the maximum air flow to leave the system and is closed progressively while the system increases its temperature. This increases the pressure inside the heat exchanger 45, hence the water saturation temperature is increased too. Once the product temperature reaches the set point, the stable running condition starts.

The higher the drying temperature is, the higher the drying rate is too; however, many products are damaged at high temperatures. For low temperature stable running, below the boiling point, the pressure inside container 25 is lower than the ambient one. Air is sucked up through inlet 10; valve 15 is partially closed to restrict the amount of incoming air and to keep the partial vacuum inside container 25. Since the restriction on valve 15 increases the delta pressure for compressor 35, valve 55a is open further to compensate the system and to keep the drying rate and energy flow as high as possible.

FIG. 10 shows a preferred embodiment for performing the disclosed method for dripping control. The product 22b which is warm and expel vapor 80 is contained inside perforated wall 25b. Vapor 80 goes through the perforated wall 25b before condensates on the inner surface of wall 25a which is cold because its exterior surface is cooled down by the ambient air. The condensed drops 81 fall into pool 82 where they are collected and drained trough pipe 83 to the drainage 84 or returned to the process. Dry product 22c is released by airlock valve 23.

FIG. 11 shows a preferred embodiment for performing the disclosed method in a continuous dryer for laminar products like papers and paperboards. Since the dryer in paper making machines is very large, it is not practical to contain the whole dryer inside one equipment; it is recommendable that each drying phase has different equipment. In FIG. 11 are shown 10 heated rotating cylinders (elements 1 to 10) and 4 rolls for aeration (elements 11 to 14); however, the dryer can have as many cylinders and rolls as the process requires for a faster drying; the higher the speed of wet paper 17a, the more drying cylinders. Actual paper dryers use 40 or more heated cylinders.

Assuming that the dryer is installed in a place with an ambient pressure of 1 atm and the wet paper 17a comes at 30° C., the rotating heated cylinders 1 and 2 warm it up to around 80 to 95° C. Then, paper 17a passes to the constant phase section, rotating heated cylinders 3, 4, 5 and 6; its temperature gets slightly over the boiling point, about 101 to 105° C., due to the high evaporation rate. Once in the falling drying section, rotating heated cylinders 7, 8, 9 and 10, the paper temperature rises even further to around 110 to 150° C. because the evaporation rate is lower and cannot absorb all the energy from the heated cylinders. Finally, when the paper reaches the aeration section, rolls 11, 12, 13 and 14, it is totally dry but is surrounded by vapor which may condensate on the paper; to prevent this, air 29 at about 60 to 100° C. is blown through air distributor 30 to displace this vapor, and the dried paper 17b leaves dryer towards reel up.

Vapor at around 200 to 600 kPa (29 to 87 psia) comes through pipe 15 to cylinders 3 to 10. Most of the vapor is condensed inside the cylinders and the heat is transferred through the cylinders' walls to the paper 17a. The condensate and the blow-through steam, at around 120 to 160° C., leave the cylinders 3 to 10 through pipe 18 towards the flash tank 24 where the steam 22 and water 21 are separated; the exhaust pipe 20 transports the steam 22 inside the cylinders 1 and 2 where it condenses on inner cylinders' surfaces to warm up paper 17a. The condensate leaves cylinders 1 and 2 through pipe 23 to return to the forming paper section.

Water 21 goes inside pipe 25 towards heat exchanger 26 to warm up ambient air 28 blown by fan 27; this warm air 29 is distributed by duct 30 over the paper 17b surface to remove the vapor left on it. Dampers, not shown, can be installed on distributor 30 to control the amount of air along the paper 17b width to adjust the moisture profile. The humid air 31 is sucked up by fan 32 into hood 33 to be exhausted to ambient.

Vapor 34, which results from water evaporation from paper 17a on upper cylinders 4 and 6, is pulled into hood 16 and duct 19. Vapor 36, which results from water evaporation from paper 17a on upper cylinders 8 and 10, is pulled into hood 39 and duct 37. Since the evaporation rate is higher in constant section, cylinders 4 and 6, than in falling section, cylinders 8 and 10, duct 37 is smaller than duct 19. Dampers 35 and 38 control the flow in ducts 19 and 37, respectively, to reduce the amount of incoming air; ideally, only vapor should come inside these ducts. Duct 40 collects saturated vapor at 100° C. from ducts 19, 37 and 41 to deliver it to the suction of compressor 42, which compresses the vapor and delivers it to pipe 15.

At start up, the whole equipment is at ambient temperature; using only the compressor 42 to warm it up may take too long due to its massive components, cylinders, rolls, pipes, heat exchanger, tank and ducts. Steam is available in paper making facilities and can be used temporary for starting up the dryer; it is injected into pipe 15 by pipe 50. This warms up faster the equipment; once the operational temperature is reached, the valve 51 is closed.

When there is excessive condensation on equipment walls, especially in cold weathers, the drying rate is reduced too. The useful dripping becomes too much reducing the available vapor for compression. In this case of cold weathers, one option is to partially open the valve 51 to allow a small amount of steam into pipe 15 during operation; this compensates the extra heat losses. The other option is to reduce the heat losses and dripping by thermal insulation of the equipment, not shown.

FIG. 12 shows a preferred embodiment for performing the disclosed method for dripping control in a hood. The paper 17 is heated by upper rotating cylinders 4 and 6 and expels vapor 34 that is condensed on the inner surface of hood 16, which is cold because its exterior surface is cooled down by the ambient air. The condensed drops 43 fall on trays 441 where they are collected and fall through the holes 451 to the a lower tray 441 until they reach the pool 452 at bottom tray 46. Pipe 47 drains pool 452 to return the water to the process or to dispose it into the drainage.

Other option to collect the condensed water, not shown, is to drain it at the end of each tray without using holes 451; this is useful when drying dusty products because a paste is formed with the dust-water mix. In Addition, water can be supplied at one end of the tray to flush the paste, and the mix is drained at the other end.

Vapor 48, from paper 17 over bottom cylinders 3, 5 and 7, is sucked up into collectors 49. Duct 41 transports this vapor 48 to the compressor (Element 42 in FIG. 11). Dampers 52 control the flow in duct 41 to reduce the amount of incoming air; ideally, only vapor should come inside this duct.

PATENT LITERATURE

PTL1: U.S. Pat. No. 2,477,044. 1946. Apparatus for dehydrating materials. James H Carmean.

PTL2: U.S. Pat. No. 5,806,204. 1998. Material dryer using vacuum drying and vapor condensation. Karl H. Hoffman, Michael Pastore, Walter Glowacki

The invention claimed is:

1. A method for totally or partially drying a product in a drying equipment, wherein the method is driven by one or more compressors acting on an air/vapor mix released by the product, integrates the drying phases of (i) Warming up, (ii) Constant drying, (iii) Falling drying, and (iv) Aeration, and controls a dripping formed in the drying equipment, comprising the steps of: a) reducing the pressure inside the drying equipment by the action of the compressor; b) sucking up ambient air into the drying equipment through an air inlet; c) warming up said air and the product with a heat exchanger which evaporates the moisture in the product, releasing the air/vapor mix; d) compressing the air/vapor mix released by the product by means of the compressor which increases its temperature and its thermal energy; e) transferring the thermal energy from the compressed mix inside the heat exchanger to the product and air on the other side of the heat exchanger, which reduces the mix temperature, condensates most of its vapor and warms up the product and the air on the other side of the heat exchanger; generating an air/vapor/condensate mix inside the heat exchanger; and f) discharging all the air/vapor/condensate mix.

2. The method according to claim 1, wherein ambient air comes into the process through an air inlet regulated by a valve which controls an amount of incoming air and the pressure inside the drying equipment for each drying phase: (i) Warming up, (ii) Constant drying, (iii) Falling drying, and (iv) Aeration.

3. The method according to claim 1 wherein all the air/vapor/condensate mix leaves the process through an outlet regulated by a valve.

4. The method according to claim 1, wherein the amount of vapor in the air/vapor mix to be compressed changes according to each drying phase: warm up; constant; falling; and aeration.

5. The method according to claim 1, wherein the method is adapted for a batch drying process.

6. The method according to claim 1, wherein the method is adapted for a continuous drying process.

7. The method according to claim 1, wherein the drying equipment has an inside maximum temperature above the boiling point of water at atmospheric pressure.

8. The method according to claim 1, wherein the drying equipment has an inside maximum temperature below the boiling point of water at atmospheric pressure.

9. The method according to claim 1, wherein the dripping that occurs on the drying equipment surfaces is collected and enhanced by cooling down said surfaces.

10. The method according to claim 9, wherein the drying equipment has a double wall having an inner wall and an outer wall, the inner wall is a barrier that allows the free flow of the air/vapor mix but the product; and the vapor is condensed on the surface of the outer wall.

11. The method according to claim 9, wherein the drying equipment has a double walled pipe having an inner pipe and an outer pipe; the external pipe is a barrier that allows the free flow of the air/vapor mix but the product; and the vapor is condensed on the external surface of the inner pipe.

12. The method according to claim 1, wherein the method is used for drying a laminar product such as paper and paperboard; and the heat exchanger is heated rotating cylinders.

13. The method according to claim 1, wherein the method is applied until the falling phase when the product moisture is higher than the equilibrium moisture (Meq).

* * * * *